United States Patent
Miller et al.

(10) Patent No.: US 11,577,976 B2
(45) Date of Patent: Feb. 14, 2023

(54) IODINATED RESIN CARTRIDGE FOR SPRAY BOTTLE

(71) Applicant: IOTEX ANTI-INFECTION PRODUCTS INC., Barrie (CA)

(72) Inventors: Larry Miller, Barrie (CA); Ronald S. Diamond, Montreal (CA)

(*) Notice: Subject to any disclaimer, the term of this patent is extended or adjusted under 35 U.S.C. 154(b) by 93 days.

(21) Appl. No.: 16/906,670

(22) Filed: Jun. 19, 2020

(65) Prior Publication Data
US 2020/0399151 A1    Dec. 24, 2020

Related U.S. Application Data

(60) Provisional application No. 62/864,943, filed on Jun. 21, 2019.

(51) Int. Cl.
| | |
|---|---|
| *C02F 1/50* | (2006.01) |
| *B05B 11/00* | (2006.01) |
| *C02F 1/68* | (2023.01) |
| *B08B 3/08* | (2006.01) |

(52) U.S. Cl.
CPC ............ *C02F 1/50* (2013.01); *B05B 11/0054* (2013.01); *B08B 3/08* (2013.01); *C02F 1/68* (2013.01); *C02F 2303/04* (2013.01)

(58) Field of Classification Search
None
See application file for complete search history.

(56) References Cited

U.S. PATENT DOCUMENTS

| | | | | |
|---|---|---|---|---|
| 3,327,859 A | * | 6/1967 | Pall | B01D 29/21 210/314 |
| 5,211,973 A | * | 5/1993 | Nohren, Jr. | A47G 19/12 426/82 |
| 5,273,649 A | | 12/1993 | Magnusson et al. | |
| 5,370,534 A | * | 12/1994 | Wolf | A61C 1/052 433/80 |
| 5,851,388 A | * | 12/1998 | Suh | C02F 1/441 210/260 |
| 5,928,512 A | | 7/1999 | Hatch et al. | |
| 6,569,329 B1 | * | 5/2003 | Nohren, Jr. | B01D 35/027 210/489 |

(Continued)

FOREIGN PATENT DOCUMENTS

| | | | |
|---|---|---|---|
| WO | WO-2006021966 A1 | 3/2006 | |
| WO | WO-2019083926 A1 * | 5/2019 | ............ C02F 1/001 |

OTHER PUBLICATIONS

Katadyn, Owner's Manual—MyBottle Portable Water Purification System; Katadyn ViruStat REplacement Cartridge (Model#8011555) Print No. 8018905/0, Katadyn.

*Primary Examiner* — Nina Bhat
(74) *Attorney, Agent, or Firm* — Perry + Currier

(57) ABSTRACT

A cartridge assembly for dispensing a disinfecting water is disclosed. The cartridge assembly has a cartridge for receiving water from a container and a water dispensing mechanism for receiving water from the cartridge and delivering the water to a surface. The cartridge holds an iodinated resin for eluting a quantity of iodine into the water passing through the cartridge. When the water dispensing mechanism is actuated, water is delivered from a container to the water dispensing mechanism and the water is delivered to the surface to be disinfected.

6 Claims, 2 Drawing Sheets

(56) References Cited

U.S. PATENT DOCUMENTS

| | | | | |
|---|---|---|---|---|
| 7,329,385 | B1* | 2/2008 | Radicone | C02F 1/766 |
| | | | | 422/123 |
| 7,585,409 | B2* | 9/2009 | Bommi | B01D 21/02 |
| | | | | 210/120 |
| 9,750,834 | B1* | 9/2017 | Hammarback | A61C 1/0076 |
| D858,690 | S * | 9/2019 | Fenton | D23/207 |
| 2009/0039037 | A1* | 2/2009 | O'Brien | C02F 1/002 |
| | | | | 210/791 |
| 2010/0032381 | A1* | 2/2010 | O'Brien | C02F 1/002 |
| | | | | 210/201 |
| 2010/0102002 | A1* | 4/2010 | O'Brien | C02F 1/002 |
| | | | | 210/228 |
| 2011/0284479 | A1* | 11/2011 | O'Brien | C02F 1/002 |
| | | | | 210/764 |

* cited by examiner

IODINATED RESIN CARTRIDGE FOR SPRAY BOTTLE

CROSS-REFERENCE TO RELATED APPLICATIONS

This application is related to and claims priority to U.S. application entitled "Iodinated Resin Cartridge For Spray Bottle" having application No. 62/864,943, filed Jun. 21, 2019 and incorporated by reference herein.

BACKGROUND

Cleaning and disinfection of surfaces typically employs various specialized substances in fluid form, e.g. for spraying or otherwise applying to the surface to be cleaned. The transport and storage of such materials can be costly due to the weight and volume of their fluid forms.

SUMMARY

It is an aspect of the invention to provide a cartridge assembly for dispensing a disinfecting water.

The above aspects can be attained by a system that has:
(a) a cartridge positioned to receive water from a container, the cartridge containing an iodinated resin, the iodinated resin adapted to elute a quantity of iodine into water; and
(b) a water dispensing mechanism positioned to receive water from the cartridge, the water dispensing mechanism having an outlet.

When the water dispensing mechanism is actuated; water is delivered from a container to the outlet and water is dispensed by the water dispensing mechanism.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

Figure 1:
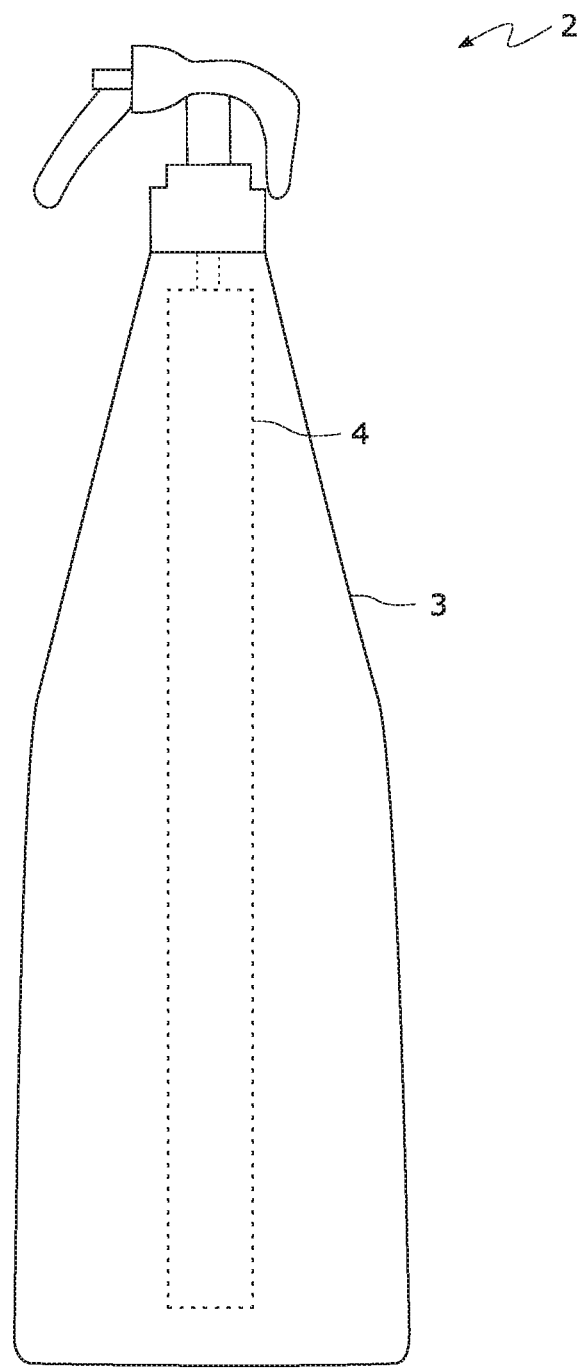
FIG. 1 shows a side view of a cartridge assembly 2.

FIG. 1 illustrates a side view of an iodinated resin cartridge assembly for a spray bottle 2 in a container 3. The cartridge 4 is configured for insertion into a bottle or other container for fluid, typically water. A wide variety of water sources may be used to fill the container 3, due to the properties of the assembly. The assembly may therefore be shipped, e.g. with an empty container, to be filled from a suitable water source in proximity to the location in which the assembly is to be used to clean and/or disinfect surfaces. For example, the water source may be a source of potable water, although the water source is not particularly limited to potable water. In some circumstances, non-potable water may be used to fill the container.

Figure 2:
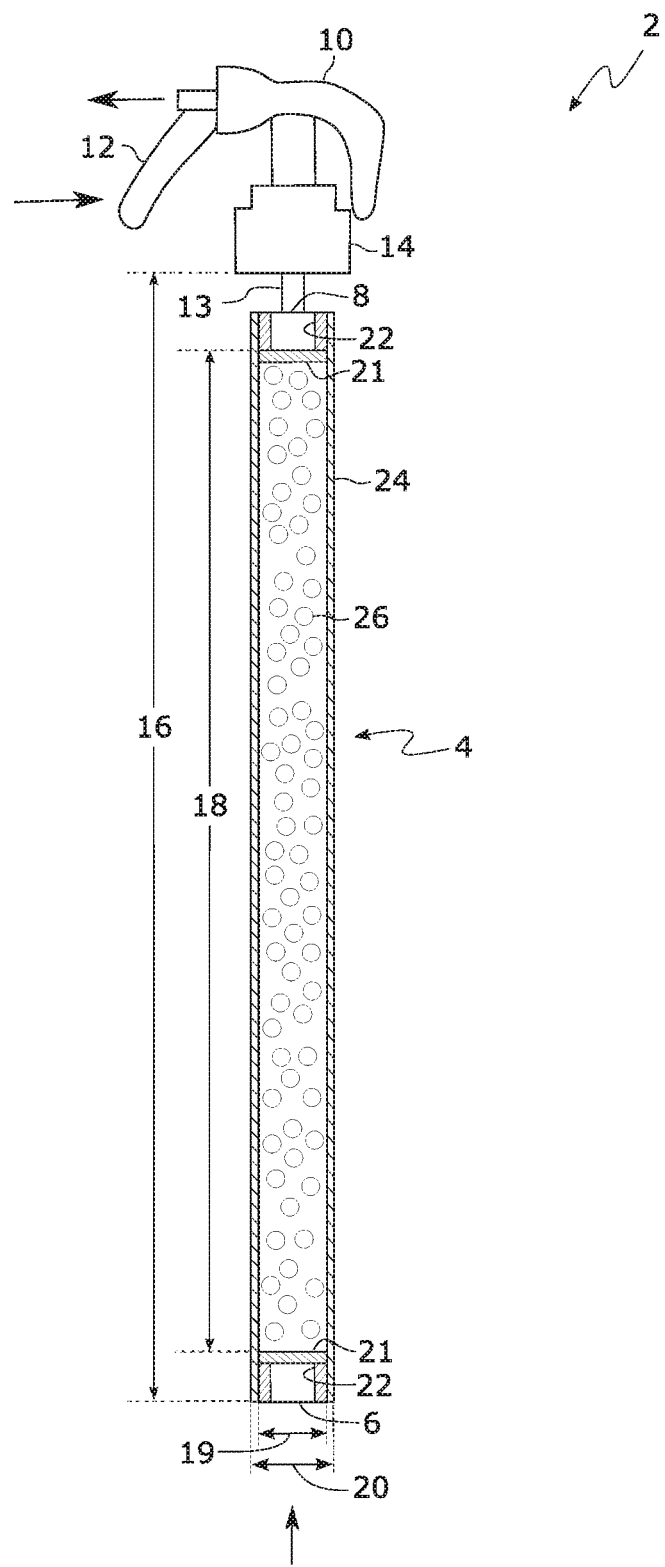
FIG. 2 shows a side cross-section of a cartridge assembly 2.

FIG. 2 illustrates a side view of an iodinated resin cartridge assembly for a spray bottle 2, with the cartridge 4 shown in cross section. A container is not shown in this view.

In general, the assembly 2 draws water into an intake 6 shown at the lower end of the assembly 2, through a bed of iodinated resin towards a cartridge outlet 8, and into a water dispensing mechanism such as a spray nozzle 10 for dispensing onto a surface. Optionally, the cartridge 4 may be attached to the spray nozzle 12 with a connector 13. The cartridge 4 may be removably attached to the spray nozzle such that the cartridge may be replaced from time to time. The spray nozzle 10 includes a pull trigger or any other suitable actuator 12 (either manually actuated or powered). As will be apparent, depression of the actuator 12 pulls water into the intake 6, and towards the outlet 8 for dispensing via the spray nozzle 10.

The spray nozzle 10 is connected to a bottle cap 14 for fitting (e.g. via threads) onto an opening of the bottle or other container (shown at 3 in FIG. 1). When the bottle cap 14 is fitted onto the container, the cartridge 4 extends into the container to place the cartridge intake 6 near the bottom of the container, as previously illustrated in FIG. 1. Thus, the length of the cartridge is generally selected according to the dimensions of the container. For example, FIG. 2 illustrates a version of the assembly 2 for use in 8- to 12-ounce bottles, in which the length of the assembly 16 between the bottle cap and the intake is between about 4 inches and about 6 inches. In another version of the assembly for use in 32-ounce bottles, the length of the assembly 16 between the bottle cap and the intake is between about 6 inches and about 8.5 inches. In other examples, the intake can have a length of between about 6 inches and about 9.25 inches. A wide variety of other dimensions will occur to those skilled in the art, depending on the size and proportions of the container and the desired flow rate through the spray nozzle. Since the volume of iodinated resin may be restricted to the volume of the cartridge 4, the concentration of iodine in the dispensed water may depend on the dimensions of the cartridge 4. A minimum length or diameter of the cartridge 4 may be required to achieve a concentration of iodine in the output water that is suitable for disinfection. In general, the Applicant has found that cartridges are effective with lengths 18 exceeding about 5 inches (i.e. about 5 inches between the intake and the outlet); with internal diameters 19 within the cartridge of about 0.375 inches or greater; and with external cartridge diameters 20 of about 0.5 inches or greater.

At each of the intake 6 and outlet 8, the cartridge 4 includes a screen 21, e.g. of muslin or other suitable porous membrane, to retain the resin inside the cartridge. The screens 21 may be impermeable to the resin 26 but permeable to water and iodine ions. In some implementations, the screens 21 may have a thickness of about 0.125 inches. The screens 21 may be retained by way of respective annular plugs 22 inserted into a cartridge housing 24 at the intake 6 and outlet 8 ends, as shown in FIG. 2. The annular plugs 22 may be press-fit into the cartridge housing 24, threaded into the cartridge housing 24, or fastened via any other suitable mechanism (e.g. adhesives). The annular plugs may comprise rubber, metal, plastic, or other suitable materials. The outer diameter of the annular plugs 22 is approximately the inner diameter of the cartridge housing 24. The inner diameter of the annular plugs 22 may be about 0.25 inches, although a wide variety of other dimensions will occur to those skilled in the art. The length of the annular plugs 22 may be about 0.5 inches.

The cartridge housing 24 contains, between the above-mentioned screens 21, a bed of iodinated resin 26. The resin particles are preferably substantially spherical, and include a suitable polymer impregnated with iodine. Various examples of such resins will occur to those skilled in the art, including resins manufactured by Hybrid Technologies Corporation located in Karlstad, Minn. USA.

Water flowing through the resin bed 26 causes iodine to elute from the resin bed 26, such that the output of the assembly 2 at the spray nozzle 10 includes iodine, for example at concentrations of between about 3 parts per million (ppm) and about 5 ppm. When the resin bed 26 is depleted or nearly depleted of iodine, the cartridge 4 may be removed and replaced. The iodine content of the output serves to disinfect surfaces on which the output is sprayed. In use, the container is filled with water from any suitable source, including tap water, bottled water (e.g. spring water, distilled water, etc.), as well as potentially contaminated water sources (waterways and the like). The passage of water through the cartridge 4 may serve to disinfect the water and also elute iodine into the water for application to the surface to be disinfected.

When the assembly 2 is affixed to the filled container, the spray nozzle 10 is aimed at the surface to be disinfected, and the trigger or other actuator 12 is depressed to spray a suitable volume of iodinated water onto the surface. A suitable volume of iodinated water is a volume sufficient to wet the entire surface to be disinfected, and therefore depends on the size of the surface. The trigger 12 may be actuated repeatedly to achieve sufficient coverage, or the trigger may be held for a period of time (e.g. about 5 seconds to about 15 seconds, though shorter and longer time periods are also contemplated) if the assembly 2 is capable of continuous dispensing (e.g. via a powered pump).

The surface may then be wiped dry. In some examples, the surface is left wet for a period of time, e.g. from about 5 seconds to about 1 minute (though shorter and longer time periods are also contemplated).

Testing conducted by the Applicant on cartridge assemblies constructed according to the above disclosure indicates that the cartridge assembly 2 is effective to obtain more than 99% reduction in various viral, fungal and bacterial counts. Specifically, viral, fungal or bacterial suspensions were applied to sterile growth media and sprayed with water passed through the above cartridge assembly 2 to acquire iodine. After 1 to 5 minutes of exposure to the iodinated water, a neutralizing broth was applied to the growth media, and a portion of the broth was plated to further sterile growth media and incubated (e.g. for 2 to 7 days). Relative to an initial number of colonies before spraying, the broth from sprayed samples yielded less than 1% of the number of colonies after spraying. Fungi, viruses and bacteria tested include Streptococcal bacteria, *Candida auris, Escherichia coli, Staphylococcus aureus, Pseudomonas aeruginosa, Klebsiella pneumoniae, Acinetobacter baumannii*, MS2-Norovirus, *Clostridium difficile*, and *Malassezia* fungus. Additionally, a slurry containing 4 pathogenic bacteria was tested. The 4 pathogenic bacteria included in the slurry were *Klebsiella pneumoniae* (ATCC® 13883), *Pseudomonas aeruginosa* (ATCC® 15442), *Staphylococcus aureus* (ATCC® 6538), and *Streptococcus pneumonia* (ATCC® 49619).

A selection of the testing results is shown below:

| Viral, Fungal, Bacterial Suspension | Exposure Time | Log Removal Value (LRV) |
| --- | --- | --- |
| MS2-Norovirus | 5 minutes | 6.09 |
| *Clostridium difficile* | 1 minute | 5.37 |
| *Candida auris* | 1 minute | 6.7 |
| *Acinetobacter baumannii* | 1 minute | 5.3 |
| *Malassezia* fungus | 1 minute | 3.3 |
| Slurry of 4 pathogenic bacteria: *Klebsiella pneumoniae, Pseudomonas aeruginosa, Staphylococcus aureus*, and *Streptococcus pneumonia*. | 2 minutes | 8.2 |

We claim:

1. A method of dispensing a disinfecting water using a cartridge assembly, the method comprising:
    actuating a water dispensing mechanism;
    delivering water from a container to a cartridge;
    delivering water from a cartridge to a water dispensing mechanism; and
    dispensing water from a water dispensing mechanism;
    wherein the cartridge includes an iodinated resin, the iodinated resin producing an elute as water passes through the cartridge, the elute comprising iodine at a concentration of 5 parts per million;
    wherein delivering water from the container to the cartridge comprises delivering water through a first screen positioned at a first end of the cartridge, the first screen permeable to water and iodine and impermeable to the resin, the first screen retained between a first annular plug and the resin, the first screen having an outer diameter larger than an inner diameter of the first annular plug;
    wherein delivering water from the cartridge to the water dispensing mechanism comprises delivering water through a second screen positioned at an opposite end of the cartridge, the second screen permeable to water and iodine and impermeable to the resin, the second screen retained between a second annular plug and the resin, the second screen having an outer diameter larger than an inner diameter of the second annular plug; and
    wherein water dispensed by the water dispensing mechanism comprises iodine.

2. The method of claim 1 wherein the quantity of iodine eluted into the water is suitable for disinfection.

3. The method of claim 1 wherein the iodinated resin includes a polymer.

4. The method of claim 1, wherein actuating the water dispensing mechanism sprays water from the water dispensing mechanism.

5. The method of claim 1 further comprising sealing the water dispensing mechanism to an opening of the container.

6. The method of claim 1 wherein the water dispensing mechanism is removably attached to the cartridge.

* * * * *